(12) United States Patent
Anderson et al.

(10) Patent No.: US 7,965,671 B2
(45) Date of Patent: Jun. 21, 2011

(54) DYNAMIC CHANNEL SHARING USING BANDWIDTH METRICS

(75) Inventors: Arthur E. Anderson, Placentia, CA (US); Wendell Y. Kishaba, San Diego, CA (US); Timothy J. Hughes, San Diego, CA (US)

(73) Assignee: Powerwave Cognition, Inc., Santa Ana, CA (US)

( * ) Notice: Subject to any disclaimer, the term of this patent is extended or adjusted under 35 U.S.C. 154(b) by 0 days.

(21) Appl. No.: 12/242,462

(22) Filed: Sep. 30, 2008

(65) Prior Publication Data

US 2009/0116511 A1    May 7, 2009

Related U.S. Application Data

(63) Continuation-in-part of application No. 11/947,928, filed on Nov. 30, 2007.

(60) Provisional application No. 60/976,730, filed on Oct. 1, 2007, provisional application No. 60/976,735, filed on Oct. 1, 2007, provisional application No. 60/976,740, filed on Oct. 1, 2007, provisional application No. 60/976,744, filed on Oct. 1, 2007, provisional application No. 60/976,747, filed on Oct. 1, 2007, provisional application No. 60/976,748, filed on Oct. 1, 2007.

(51) Int. Cl.
*H04B 7/212* (2006.01)
(52) U.S. Cl. .......................... 370/322; 370/329; 370/348
(58) Field of Classification Search .................. 370/229, 370/230, 230.1, 231–238, 351, 431, 321–349
See application file for complete search history.

(56) References Cited

U.S. PATENT DOCUMENTS

| 6,542,467 | B2 * | 4/2003 | Umayabashi | 370/236 |
|---|---|---|---|---|
| 6,757,263 | B1 * | 6/2004 | Olds | 370/315 |
| 7,062,687 | B1 | 6/2006 | Gfeller | |
| 7,616,565 | B2 | 11/2009 | Park et al. | |
| 7,801,153 | B2 | 9/2010 | Anderson et al. | |
| 2002/0067736 | A1 * | 6/2002 | Garcia-Luna-Aceves et al. | 370/442 |
| 2003/0067906 | A1 * | 4/2003 | Young | 370/347 |
| 2003/0202469 | A1 * | 10/2003 | Cain | 370/230 |
| 2003/0231588 | A1 | 12/2003 | Roth et al. | |
| 2004/0008726 | A1 * | 1/2004 | Kelly et al. | 370/468 |
| 2004/0100929 | A1 * | 5/2004 | Garcia-Luna-Aceves | 370/338 |
| 2005/0053005 | A1 * | 3/2005 | Cain et al. | 370/235 |

(Continued)

FOREIGN PATENT DOCUMENTS

KR    20020055285    7/2002

(Continued)

OTHER PUBLICATIONS

"International Search Report", *ISR of* Jan. 28, 2009 for PCT Application No. PCT/US2008/077331.

(Continued)

*Primary Examiner* — Kwang B Yao
*Assistant Examiner* — Juvena Loo
(74) *Attorney, Agent, or Firm* — Strategic Patents, P.C.

(57) ABSTRACT

In a Mobile Ad Hoc Network (MANET), each node calculates a bandwidth output value representative of data output requirements for the node relative to the transmit time slots available to the node. This value is shared with other nodes in the MANET and may be employed to more efficiently allocate channel usage among nodes as traffic demands and network topology change.

18 Claims, 5 Drawing Sheets

U.S. PATENT DOCUMENTS

| | | | |
|---|---|---|---|
| 2005/0083848 A1* | 4/2005 | Shao et al. | 370/238 |
| 2006/0114851 A1* | 6/2006 | Gupta et al. | 370/329 |
| 2006/0262786 A1* | 11/2006 | Shimizu et al. | 370/389 |
| 2006/0268879 A1* | 11/2006 | Xhafa et al. | 370/392 |
| 2007/0104177 A1 | 5/2007 | Hwang et al. | |
| 2007/0195817 A1 | 8/2007 | Denney et al. | |
| 2007/0237081 A1* | 10/2007 | Kodialam et al. | 370/235 |
| 2008/0198815 A1 | 8/2008 | Liu | |
| 2009/0054073 A1 | 2/2009 | Roy et al. | |

FOREIGN PATENT DOCUMENTS

| | | |
|---|---|---|
| WO | WO-01/028170 | 4/2001 |
| WO | WO0128170 | 4/2001 |
| WO | WO-0128170 A2 | 4/2001 |
| WO | WO-03/090083 A1 | 10/2003 |
| WO | WO-2009/046143 A2 | 4/2009 |
| WO | WO-2009/046143 A3 | 4/2009 |

OTHER PUBLICATIONS

Vaidya, Nitin et al., "Distributed Fair Scheduling in a 1-25, 66-85", *IEEE Trans. on MObile Computing*, vol. 4, No. 6, ,, (Nov. 2005),pp. 616-629.

Shiann-Tsong, S. et al., "A Bandwidth AllocationiSharingIExtension Protocol 26-45", *IEEE Journal on Selected Areas in Communications*, vol. 19, No. 10, ,, (Oct. 2001),pp. 2025-2080.

Qi, Xue et al., ""Ad hoc QoS on-demand routing (AQOR) in mobile ad hoc networks,"", *Journal of Parallel and Distributed Computing,*, (2003),pp. 154-165.

ISR, "International Search Report", PCT/US2008078501, (Apr. 28, 2009),all.

Sung Park, et al., "Network Communication Scheduling", U.S. Appl. No. 11/678,668, filed Feb. 26, 2007.

Lichun Bao, et. al., "Channel Access Scheduling in Ad Hoc Networks with Unidirectional Links", Computer Science Dept. and Computer Engineering Dept., University of CA, 2001.

Sung Park, et al., "Communication Scheduling of Network Nodes", U.S. Appl. No. 11/842,998, filed Aug. 22, 2007.

Daniel L. Cormier, et al., "Determining a Mode to Transmit Data", U.S. Appl. No. 11/548,763, filed Oct. 12, 2006.

Lichun Bao, et. al., "Hybrid Channel Access Scheduling in Ad Hoc Networks", Computer Science Dept. and Computer Engineering Dept., University of CA, 2002.

"U.S. Appl. No. 11/947,928, Non-Final Office Action mailed Aug. 19, 2009", , 28 Pgs.

"European Search Report, EP-08835939", Aug. 25, 2010 , all.

\* cited by examiner

| | TIMESLOT 1 | TIMESLOT 2 | TIMESLOT 3 | TIMESLOT 4 |
|---|---|---|---|---|
| NODE 402a | RECEIVE | RECEIVE | RECEIVE | TRANSMIT |
| NODE 402b | TRANSMIT | RECEIVE | RECEIVE | RECEIVE |
| NODE 402c | RECEIVE | RECEIVE | TRANSMIT | RECEIVE |
| NODE 402d | RECEIVE | TRANSMIT | RECEIVE | RECEIVE |

Fig. 4

DYNAMIC CHANNEL SHARING USING BANDWIDTH METRICS

RELATED APPLICATIONS

This application is a continuation-in-part of U.S. patent application Ser. No. 11/947,928 filed on Nov. 30, 2007, incorporated by reference herein in its entirety. This application also claims the benefit of the following U.S. Provisional Patent applications, each of which is incorporated by reference herein in its entirety:

U.S. App. No. 60/976,730 filed on Oct. 1, 2007;
U.S. App. No. 60/976,735 filed on Oct. 1, 2007;
U.S. App. No. 60/976,740 filed on Oct. 1, 2007;
U.S. App. No. 60/976,744 filed on Oct. 1, 2007;
U.S. App. No. 60/976,747 filed on Oct. 1, 2007; and
U.S. App. No. 60/976,748 filed on Oct. 1, 2007.

STATEMENT REGARDING FEDERALLY SPONSORED RESEARCH

This invention was made with support of the United States Government under Contract MDA972-01-9-0022. The United States Government may have certain rights in the invention.

BACKGROUND

This application relates to traffic management in mobile ad hoc networks, and more particularly to use of nodal bandwidth metrics to allocate access to wireless communication channels. There remains a need for techniques to dynamically allocate channel access in the context of changing traffic demands and network topologies typical of a mobile ad hoc network.

SUMMARY

In a Mobile Ad Hoc Network (MANET), each node calculates a bandwidth output value representative of data output requirements for the node relative to the transmit time slots available to the node. This value is shared with other nodes in the MANET and may be employed to more efficiently allocate channel usage among nodes as traffic demands and network topology change.

In one aspect, a method disclosed herein includes: determining a value indicative of a data output requirement for a node in an ad hoc network, the node having a plurality of one hop neighbors coupled in direct wireless communication with the node; determining a value indicative of a transmission capacity for the node; calculating a bandwidth output metric for the node based upon the transmission capacity and the data output requirement; and communicating the bandwidth output metric to the plurality of one hop neighbors of the node.

In another aspect, a computer program product disclosed herein includes computer executable code that, when executing on one or more devices, performs the steps of: determining a value indicative of a data output requirement for a node in an ad hoc network, the node having a plurality of one hop neighbors coupled in direct wireless communication with the node; determining a value indicative of a transmission capacity for the node; calculating a bandwidth output metric for the node based upon the transmission capacity and the data output requirement; and communicating the bandwidth output metric to the plurality of one hop neighbors of the node.

In another aspect, a device disclosed herein includes a data queue that stores data; a data link that packetizes data from the data queue into packets, and that negotiates access to a number of time slots in a mobile ad hoc network; a radio that provides an air interface to the mobile ad hoc network and transmits the packets during the one or more time slots; and a signal processor that calculates a bandwidth output value for the device, the bandwidth output value representing a size of the data queue relative to the number of time slots, and that transmits the bandwidth output value to one or more neighboring nodes during a control time slot.

BRIEF DESCRIPTION OF THE DRAWINGS

The invention and the following detailed description of certain embodiments thereof may be understood by reference to the following figures wherein:

FIG. 4 illustrates a transmit schedule for a four-node neighborhood.

DETAILED DESCRIPTION

The following description details certain embodiments of a dynamic segmentation and reassembly technique for use in packetizing data for transmission over wireless communication links. By tracking link quality based on local metrics and/or information shared among nodes in the network, data can be segmented and reassembled dynamically to provide more efficient use of communication links without requiring more overhead in individual packet headers. While the invention is described below in relation to Mobile Ad Hoc Networks, it will be understood that the principles of the invention may be suitably applied in any environment where link quality and/or transmission modes vary dynamically, and information relating to link quality is available to nodes participating in a network.

So-called "infrastructure" networks employ base stations at fixed locations to form a substantially fixed network infrastructure. The base stations may enable communication among the wireless devices of the network, between a wireless device and another device on another network, and so on. This general approach is employed, for example, in 802.11 or WiFi networks, as well as in cellular telephony networks. By contrast, ad hoc wireless communications networks are formed in an ad hoc manner among any number of participating nodes that may periodically join, leave, or move within the ad hoc network. Although such networks do not belong to any fixed network infrastructure, they may support conventional network communications such as point-to-point or broadcast communications, and may be adapted for use with any of the Internet Protocols (e.g. IPv4, IPv6) or similar, well-established networking protocols.

In general, a Mobile Ad Hoc Network (MANET) is an ad hoc wireless network in which some (or all) of the participating devices—also referred to herein as "nodes"—are mobile. Thus the topography of a MANET may change not only as nodes enter and leave the network, but as nodes move relative to one another within the network. As the network topology changes, communications routes through the network may also vary in terms of availability and in terms of quality. While the invention(s) disclosed herein have broad applicability, they may be particularly useful in a MANET environment where the context of continuously changing node-to-node links poses challenges to, and opportunities for, maintaining traffic flow.

Figure 1:
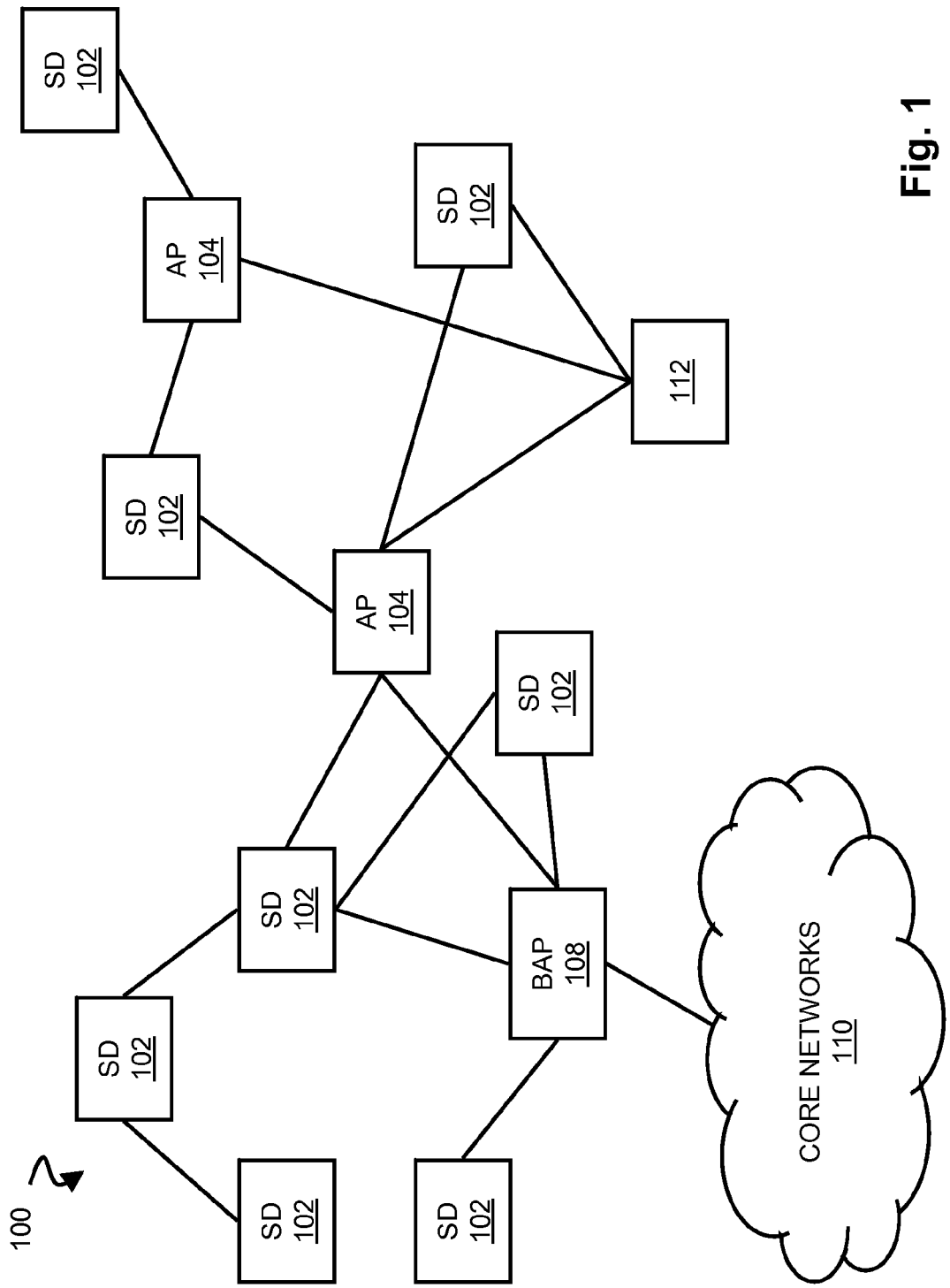
FIG. 1 is a block diagram of a Mobile Ad Hoc Network (MANET).

FIG. 1 shows a Mobile Ad Hoc Network (MANET) that may be used with the systems and methods described herein. In general, a MANET 100 may include subscriber devices 102, access points 104, and backhaul access points 108 (for coupling to a core network 110 such as the Internet), and subscriber devices 110, all generally interconnected as shown in FIG. 1. Without limiting the generality of the foregoing, one or more of the subscriber devices 102 may be a stationary device 112 that does not move within the MANET 100. It will be understood that the device-to-device links illustrated in FIG. 1 are for purposes of illustration only, and in no way are intended to limit the nature or number of links between devices in the MANET 100, which may be created, removed, and/or modified over time according to any corresponding protocols followed by the devices within the MANET 100. In general, the links among devices within the MANET 100 are wireless links, although wired links may optionally be employed in various locations such as between the backhaul access point 108 and the core networks 110. In order to maintain the MANET 100, typically one or more protocols are shared among the participating devices to control creation, removal, and modification of individual data links between devices, and to route traffic and control information among the devices. The term protocol as used herein generally refers to any and all such rules, procedures, and/or algorithms used in maintaining the MANET 100, unless a specific protocol is explicitly stated or otherwise clear from the context.

Subscriber devices 102 may include any general purpose nodes participating in the MANET 100 according to suitable protocols. It will be understood that while subscriber devices 102 may include terminal nodes that send or receive data, in a MANET 100 as described herein subscriber devices 102 may also suitably be employed as intermediate nodes to route traffic to and from other subscriber devices 102. Thus an ad hoc network as described herein is generally extensible, and as new subscriber devices 102 appear within the MANET 100, they may form a part of the MANET 100 fabric that routes traffic among other nodes. In general, subscriber devices 102 may include any network or computing devices that include a wireless interface, network protocol stack(s), and the like adapted to participate in the MANET 100. The Internet Protocol may usefully be employed in subscriber devices 102 within the MANET 100 in order to use well-established addressing schemes and the like. A subscriber device 102 may include without limitation a cellular phone, personal digital assistant, wireless electronic mail client, laptop computer, palmtop computer, desktop computer, video device, digital camera, electrical instrument, sensor, detector, display, media player, navigation device, smart phone, a wireless networking card, or any other device that might usefully participate in a network. In some embodiments subscriber devices may include a GPS receiver providing a position and timing reference. In embodiments, each subscriber device 102 may be authenticated and/or authorized before being granted access to the MANET 100.

Access points 104 may be provided to establish a permanent or otherwise generally stable infrastructure to the MANET 100. In one embodiment, the access points 104 may employ identical network functionality and protocol stacks as subscriber devices 102. However, an access point 104 may have a number of differences related to their dedicated function within the MANET 100. In one aspect, the access points 104 may have no associated computing device that originates or consumes network traffic. That is, the access points 104 may simply form a fixed mesh of participants in the MANET 100 and relay traffic among other network participants. An access point 104 may also include a physical connection to a power infrastructure so that it may be physically installed at a location and operate autonomously without requiring regular maintenance for battery changes and the like. In another aspect, access points 104 may include some minimal supplemental circuitry related to, e.g., status and diagnostics, or for receiving software updates and the like. This may improve continuity of coverage across a physical region where subscriber devices 102 may or may not be present with any regularity, and may ensure that wireless network resources are available in a desired area. In embodiments the access point 104 may be of a size and weight making it suitable for mounting and/or concealment in a variety of locations including indoor and outdoor locations, and including mounting on walls, floors, ground, ceilings, roofs, utility poles, and so forth.

Each access point 104 may include or utilize a timing reference such as any of the Network Timing Protocols described in RFC 778, RFC 891, RFC 956, RFC 958, RFC 1305, RFC 1361, RFC 1769, RFC 2030, and RFC 4330, all published by The Internet Engineering Task Force. Each access point may also, or instead, include a GPS receiver providing a position and timing reference. In embodiments the wireless access points 104 may have a greater transmit power and/or a greater antenna gain than mobile subscriber devices 102, thus providing greater physical coverage than some other devices within the MANET 100.

The MANET 100 may include one or more backhaul access points 108 that generally operate to connect nodes within the MANET 100 to a core network 110 such as the Internet. On one interface, a backhaul access point 108 may have a wireless radio interface, protocol stack(s) and other components of other nodes within the MANET 100. On another interface, the backhaul access point 108 may provide any suitable interface to the core network 110. The backhaul access point 108 may, for example, be deployed at a fiber access point or the like that provides high-speed data capacity Internet traffic. For example and without limitation, the fiber access point may include a Gig-E router site or an OC-3/12 add-drop multiplexer site. In an embodiment the backhaul access point 108 may include two Gig-E interfaces for backhaul connections. It will be understood that any number of a variety of suitable interfaces for backhaul connections may be usefully employed with a backhaul access point 108 as described herein.

A backhaul access point 108 may serve multiple access points 104 within the MANET 100, and may distribute network load across those access points 104. Alternatively, a single backhaul access point 108 may serve a single access point 104. In some embodiments, the number of access points 104 served by a backhaul access point 108 may relate to the amount of intra-MANET traffic and extra-MANET traffic, the nature and direction of multicast versus unicast data, and so forth. This association between backhaul access points 108 and access points 104 may change from time to time depending on the presence of other subscriber devices 102 within the area, network conditions, and so forth. In some cases an access point 104 may for a time be associated with more than one backhaul access point.

The core networks 110 may provide access to network resources outside the MANET 100. The core networks 114 may connect disparate, geographically remote and/or local instances of the MANET 100 to form a single network. The core networks 110 may include any and all forms of IP networks, including LANs, MANs, WANs, and so on. The core networks 110 may also or instead include the public Internet. In other embodiments the core networks 110 may consist exclusively of a single zone of administrative control, or a number of zones of administrative control, or some combination of an administrative zone and any of the foregoing.

The stationary device 112 may include any subscriber device 102 that, for whatever reason, does not physically move within the MANET 100. In general, such fixed physical points within the MANET 100 may provide useful routing alternatives for traffic that can be exploited for load balancing, redundancy, and so forth. This may include, for example, a fixed desktop computer within the MANET 100.

Details of various MANET 100 protocols—referred to collectively herein as the MANET Wireless Protocol (MWP)—are provided below. In general, any of the nodes above that participate in the MANET 100 according to the MWP may include a hardware platform enabling radio software and firmware upgrades, which may include for example a dedicated or general purpose computing device, memory, digital signal processors, radio-frequency components, an antenna, and any other suitable hardware and/or software suitable for implementing the MWP in participating nodes.

In embodiments, any of the foregoing devices, such as one of the access points 104, may also include an adapter for other networks such as an Ethernet network adapter or equivalent IP network adapter, router, and the like, so that non-MANET 100 equipment can participate in the MANET 100 through the device. It will also be appreciated that, while a connection to other core networks 110 is shown, this connection is optional. A MANET 100 (with or without fixed access points 104) may be maintained independently without connections to any other networks, and may be usefully employed for the sole purpose of trafficking data among subscriber devices 102.

Figure 2:
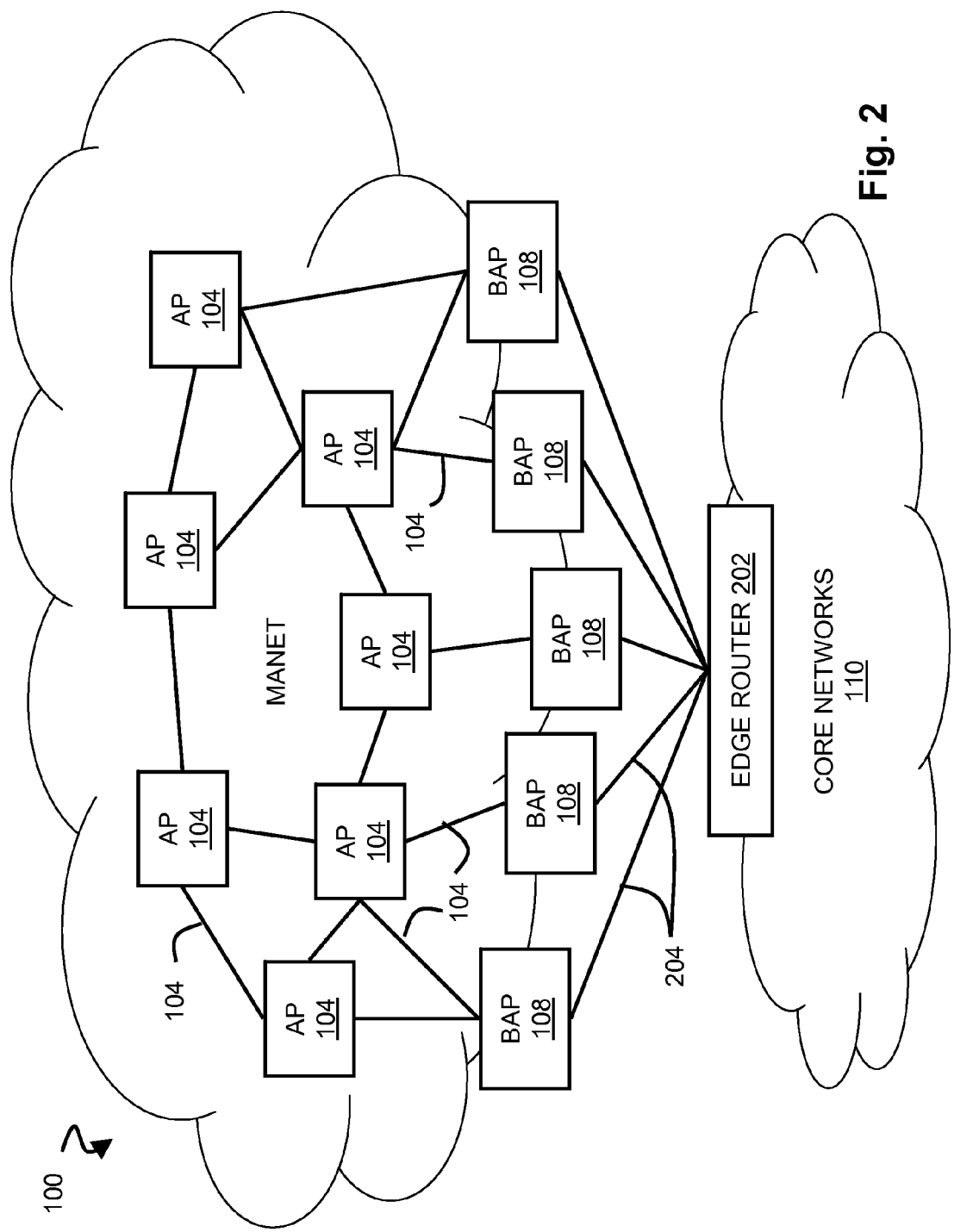
FIG. 2 is a block diagram of a MANET having multiple backhaul access points.

FIG. 2 is a block diagram of a MANET having multiple backhaul access points. In general, the MANET 100 may include subscriber devices 102 (not shown), access points 104, and backhaul access points 108 for connecting to core networks 110, and an edge router 202 that facilitates routing between the MANET 100 and the core networks 110.

The edge router 202 may include any devices or systems for maintaining connectivity between the MANET 100 and the core networks 110, and may further support or enhance network activity within the MANET 100. For example, the edge router 202 may include an industry standard and/or proprietary Address Resolution Protocol server, an application server, a Virtual Private Network server, a Network Address Translation server, a firewall, a Domain Name System server, a Dynamic Host Configuration Protocol server, and/or an Operations, Administration, Maintenance and Provisioning server, as well as any combination of the foregoing. These various components may be integrated into the edge router 202, or may be provided as separate (physical and/or logical) systems that support operation of the edge router 202. These supporting systems may in general support operations such as broadband Internet connectivity within the MANET 100 and the like, broadcast communications crossing between the MANET 100 and the core networks 110, and so forth, as well as the use of multiple backhaul access points 108 to efficiently route inter-MANET traffic among subscriber devices 102.

Figure 3:
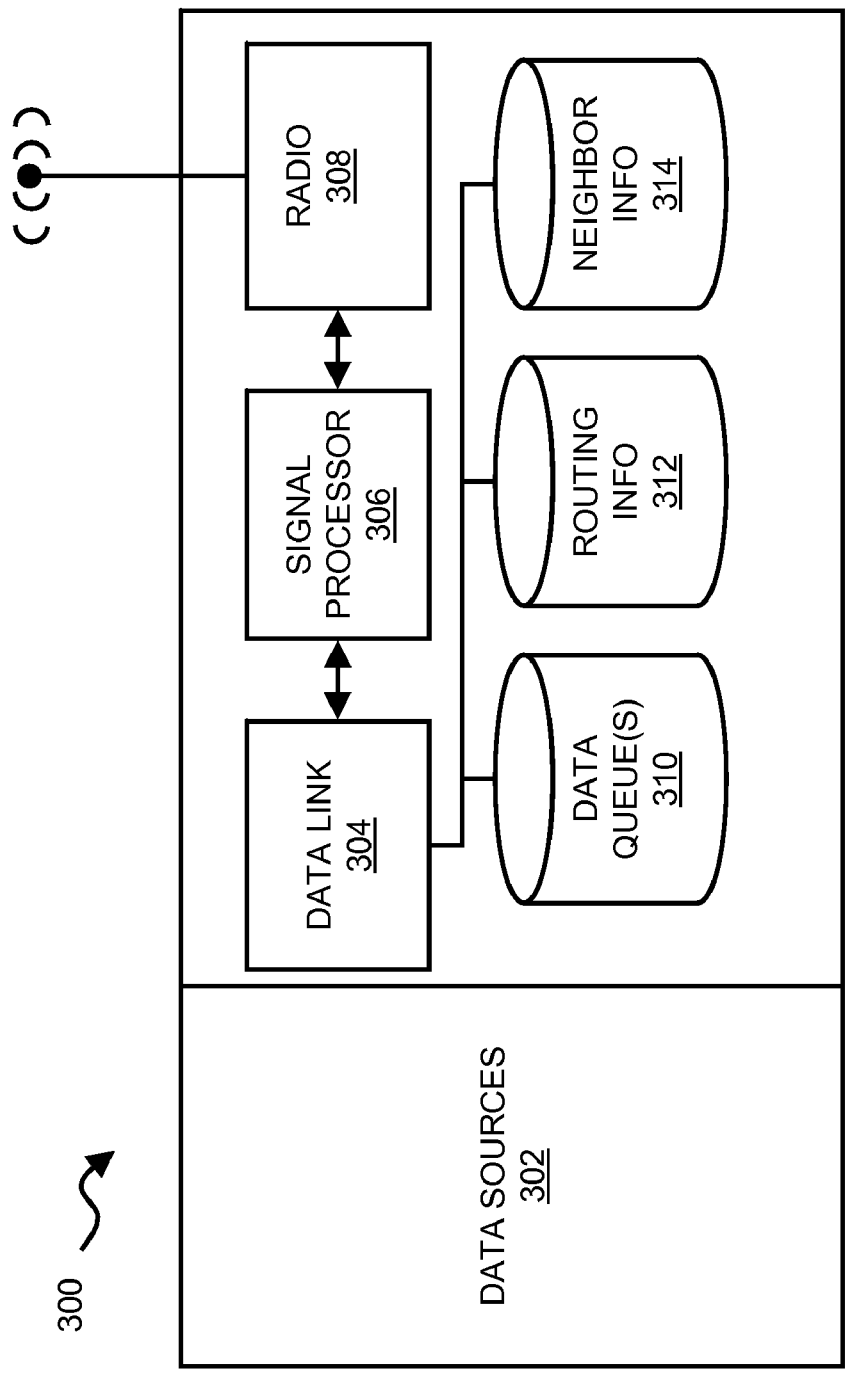
FIG. 3 is a block diagram of a node in a MANET.

FIG. 3 is a block diagram of a node in a MANET. The node may be any of the devices described above, such as a subscriber device 102, access point 104, or backhaul access point. In general the node 300 may include data sources 302, a data link 304, a signal processor 306, a radio 308, data queues 310, routing information 312, and neighborhood information 314. It will be understood that the following description is general in nature, and that numerous arrangements of processing, storage, and radio frequency hardware may be suitably employed to similar affect. This description is intended to outline certain operations of a MANET node relevant to the systems and methods described herein, and in no way limits the invention to the specific architecture shown in FIG. 3.

The data sources 302 may include any applications or other hardware and/or software associated with the node 300. This may include, for example, programs running on a laptop or other portable computing device, a web server or client, a multimedia input and/or output sources such as a digital camera or video, and so forth. More generally any device, sensor, detector, or the like that might send or receive data may operate as a data source 302 in the node 300. It will be further understood that some nodes such as access points 104 may not have independent data sources 302, and may function exclusively as MANET 100 network elements that relay data among other nodes and/or provide network stability as generally described above.

The data link 304 may include hardware and/or software implementing data link layer functionality such as neighbor management, segmentation and reassembly of data packets, Quality of Service (QoS) management, data queue servicing, channel access, adaptive data rates, and any other suitable data link functions. In general, the data link 304 controls participation of the data sources 302, and more generally the node 300, in a MANET. It will be understood that the data link 304 in FIG. 3 may implement any number of lower layer (e.g., physical layer) or higher layer (e.g., routing, transport, session, presentation, application) protocols from a conventional Open Systems Interconnection (OSI) Model, or any such protocols and related functions may be implemented elsewhere within the node 300, such as in an IP stack executing on the data source 302, or in firmware within the signal processor 306 or radio 308, or in additional functional blocks not depicted in FIG. 3. For example, routing protocols may be implemented within hardware/software of the data link 304 in order to ensure that nodes in the MANET 100 share appropriate routing functions. Thus it will be appreciated that while the certain elements discussed herein might suitably be placed within the data link layer of a formal protocol stack, the systems and methods of this disclosure might also or instead be implemented with variations to a conventional protocol stack, or without any formal protocol stack whatsoever.

The data link 304 may include a link manager that collects neighbor information from the data link layer, and may form and maintains the neighborhood information 314 for the node 300. This table may be used to establish routes to neighbors, and may be updated periodically with information from one and two hop neighbors as described further below. The link manager may monitor statistics on all active links for a node on a link-by-link basis in order to support link quality calculations and other functions described herein.

The signal processor 306 may include waveform processing and timing functions associated with transceiving data at the node 300. This may include, for example, network timing, time-slot and/or frame-based waveform configuration, maintenance of one or more families of Orthogonal Frequency Division Multiplexing waveform modes (or other transmit mode waveforms), receiver detection of waveform modes, error correction coding, and so forth. In general, the signal processor 306 may be implemented in any suitable combination of digital signal processors, field programmable gate arrays, application-specific integrated circuits, microprocessors, or other general or special-purpose computing devices.

In one embodiment, a family of Orthogonal Frequency Division Multiplexing (OFDM) waveforms may be employed for adaptive data rate communications. The modes of the OFDM waveforms may, for example, include 7.2 MHz Quadrature Phase-Shift Keying (QPSK), 4.8 MHz QPSK, 2.4 MHz QPSK, 1.2 MHz QPSK, 1.2 MHz Binary Phase-Shift Keying (BPSK), or the like. The effective data rate for transmit waveforms may be affected by other parameters such as error correction. In order to facilitate implementation of an adaptive rate system, the transmit modes may be organized into an ordered list of monotonically increasing data rates matched to correspondingly decreasing signal robustness, thus permitting unique mapping of link quality to transmit mode. In one aspect, the actual waveform mode selected to transmit data on a link may be adaptively selected according to any suitable evaluation of link quality for links to neighboring nodes.

The radio 308 in general operates to transmit data from the data queue(s) 310, as organized and encoded by the data link 304 and the signal processor 306 (along with any control information, packet header information, and so forth), over a wireless air interface to other nodes in a MANET, and to perform complementary data reception. The radio 308 may include any radio frequency analog circuitry and the like, and may be coupled to the signal processor 306 which converts data and control information between a digital representation used within the node 300, and an analog representation used in radio frequency communications with other nodes. In embodiments, a low power radio 308 may be employed, such as where the node 300 is a battery-powered mobile device. In other embodiments, a high-power radio 308 may be employed, such as where the node 300 is an access point or backhaul access point connected to a fixed power infrastructure. In an embodiment, the radio 308 and signal processor 306 provide adaptive data rate coding capable of changing transmit modes, error correction, and the like according to measured link quality.

The data queue(s) 310 may include any data for transmission from the node 300. This may include, for example, data from the data sources 302, data that is relayed by the node 300 from other nodes in the MANET, and/or control information scheduled for transmission within data packets from the node 300. The data queue(s) 310 may be organized in any suitable fashion, and may include a single first-in-first-out queue, multiple queues, prioritized queues, and the like. In one embodiment, the node 300 may include multiple prioritized queues to assist in providing various service levels, such as for QoS traffic. In general, data in the data queue(s) 310 is delivered according to any suitable queuing mechanism to the data link 304, signal processor 306, and radio 308 for transmission within the MANET.

Routing information 312 such as a routing or forwarding table may be provided to support routing functions by the node 300. In general, this may include, for example, a destination address or identifier, a cost of a path to the destination (using any suitably cost calculation), and a next hop on that path. Other information such as quality of service and other metrics for various routes and links may also be provided for more refined routing decisions.

Neighborhood information 314 may be maintained in a database, flat file, routing table, or other suitably organized volatile or non-volatile storage within the node 300. The neighborhood information 314 generally supports the creation and maintenance of the MANET as well as routing functions of each MANET node. Within the MANET, each node may interact with other nodes to autonomously identify and maintain local network connections, shift capacity, dynamically form routes throughout the network, and so on. The routing functions of the node (as supported by the neighbourhood information 314) may accommodate delay-sensitive (e.g. voice) traffic, delay-tolerant traffic with quality of service (QoS) prioritization, and so on.

The neighborhood information 314 may include an identification of neighboring nodes along with information relating to those nodes. This may include one-hop neighbors (i.e., neighboring nodes in direct wireless communication with the node 300), two-hop neighbors (i.e., neighboring nodes that communicate with the node 300 through only one other node), or any other nodes or participants within the MANET. In one aspect, neighborhood information 314 includes link quality information for the radio 308, which may be obtained from any combination of physical layer and data link data, and may be employed to adapt the data rate of communications according to currently present channel conditions. The neighborhood information may also include QoS data used to select next hops for QoS data. Other useful information may include bandwidth utilization, node weights, node position (either logical or physical), and queue latency for each QoS type and/or other priority type.

In one aspect, the neighborhood information 314 may be gathered during periodic exchanges (such as during control transmissions) with neighboring nodes, which may occur under control of the link manager of the data link 304. For example, the node 300 may determine output bandwidth (i.e., data transmit requirements) for each link that the node 300 has with a neighbor, and may transmit this to one-hop neighbors. Similarly, the node 300 may receive output bandwidth from each one-hop neighbor. Using this data, each node 300 may further calculate its own input bandwidth (i.e., data receive requirements) from each link to a neighboring node, and this information may in turn be exchanged with one-hop neighbors. Following a system-wide exchange with one-hop neighbors, the node 300 (and every other node in the MANET) may calculate a node weight that represents relative output requirements for the node 300. For example, the node weight, W, may be calculated as:

$$W = \frac{BW_{out}}{BW_{out} + BW_{in}} \quad [\text{Eq. 1}]$$

where $BW_{out}$ is the total output or transmit requirements for each link of the node 300, and $BW_{in}$ is the total input or receive requirements for each link of the node 300. Finally, the node 300 may transmit the node weight to each neighboring node, and may in turn receive a node weight from each neighboring node. It will be appreciated that the node weight, W, may be further processed for use with other neighborhood information 314, such as by limiting the value according to the number of bits used for control information, or by providing a supplemental adjustment to the node weight to further refine control of routing or other MANET functions. Sharing of information for maintenance of the neighborhood information 314 may be controlled, for example, by the data link 304, which may apply any suitable technique to determine when to share information with one hop neighbors. In one aspect, the data link 304 may transmit data whenever a change is detected in the MANET such as an addition or deletion of a node.

In another aspect, for a MANET that has location-aware nodes 300 (e.g., using Global Positioning System (GPS) data, signal strength data, and so forth), the neighborhood information 314 may include position data in order to support location-based routing and the like.

Having described a MANET in general terms, the description now turns to a more detailed treatment of the manner in which bandwidth metrics are shared among nodes and used to manage channel access.

FIG. 4 illustrates a transmit schedule for a four-node neighborhood that includes nodes 402a through 402d. In general, the transmit schedule 400 provides collision-free scheduling among the nodes by allowing only one node to transmit (e.g., within a one or two hop neighborhood) during each timeslot. In order for the transmit schedule to effectively provide channel access, each participating node should have a consistent view of the network. In a dynamic network, this consistency may be achieved by constantly exchanging control information among one-hop neighbors, as generally described below. This may include, for example, the node ID of the originator and the node ID of all the one-hop neighbors of the originator. Upon receiving control information, each node can create a comprehensive list of neighbors using the node ID of the originator (which is a one hop neighbor of the receiver) and node ID of each one hop neighbor of the originator (which are two-hop neighbors of the receiver). While this simple exchange of information provides useful topology information, it does not generally reflect demands for channel use within the MANET neighborhood.

Figure 5:
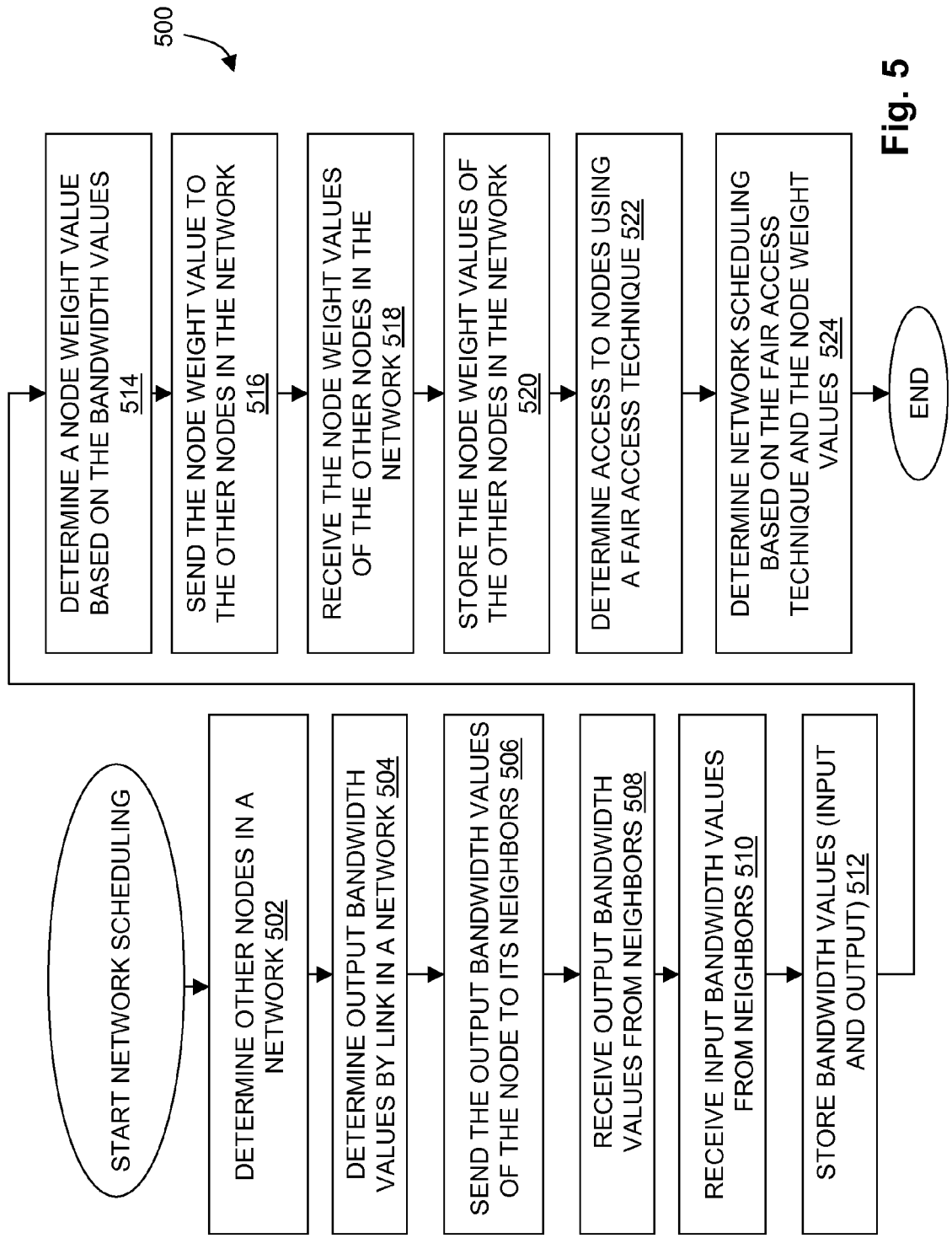
FIG. 5 is a flow chart of a process for managing channel access in a MANET.

FIG. 5 is a flow chart of a process for managing channel use in a MANET. In general, the process 500 operates to schedule channel access (such as time slots) using a fair access technique that is weighted according to bandwidth needs of each node. The process 500 may be performed by each node in a MANET independently.

As shown in step 502, the process 500 may begin by determining other nodes in a network. For example, during the control timeslots, each node may broadcast its node ID to one-hop neighbors.

As shown in step 504, each node may then determine its output bandwidth value for each link. In general, the output bandwidth value is a value representative of the data output requirements for a node. This step may include an evaluation of any packets in the data queue(s) for each link. The actual value may be the number of packets waiting in outbound queues of a node. Or the actual value may be a value representative of queue depth, such as a value from 1 to 7 representing a sliding scale associated with the number packets. The output bandwidth value may represent an actual numerical value (or range of values) for the number of packets, or a relative value normalized according to the packet count for each queue. In one embodiment, the output bandwidth value may be determined relative to the total output data capacity for a node, such as a capacity based upon time slots allocated for the node to transmit using a weighted fair access technique, an unweighted fair access technique, or any other scheduling and/or access control mechanism employed by the node. Thus the output bandwidth value may provide a relative indication of queued data to output capacity. This metric may usefully be employed in node weight calculations, resulting in a fair access mechanism skewed toward nodes with relatively high or growing output requirements. In one embodiment, a minimum or maximum value may be provided for the output bandwidth value. In an embodiment, a minimum or maximum increment size may be provided in order to limit the rate of change in the output bandwidth value. Thus for example, the bandwidth output may be tuned to rise immediately in response to an increasing queue depth, but may fall slowly in response to a decreasing queue depth.

More generally, the output bandwidth value may be tuned, weighted, or otherwise revised or adjusted to achieve a variety of scheduling objectives. For example, an environment where most nodes are expected to be downloading large quantities of identical data (e.g., streaming video) may be tuned for different performance than an environment where each node is expected to regularly source unique data (e.g., voice). In general, factors that may be accounted for in adjusting a calculation of output bandwidth include latency, throughput, overhead, number of channel frequencies, stability of the network, size of the network, and so forth. While these factors do not dictate a particular calculation for the output bandwidth value under any specific circumstances, they do illustrate the types of design objectives and trade offs that may be addressed by adjustments to the bandwidth output value calculation, each of which may serve to skew channel usage in proportion to actual or anticipated needs. It will further be appreciated that the output bandwidth value calculation may also take account of varying traffic types, such as by weighting higher priority queues more heavily in the calculation, or by using a multiplier when high priority data is present in the queues.

As shown in step 506, each node may then send its output bandwidth values to its neighbors, such as its one hop neighbors.

As shown in step 508, each node may then receive the output bandwidth from each neighbor, and as a result, may determine an input bandwidth value for itself representative of the data input requirements for the node in order to receive data queued for transmission to the node from each of the neighboring nodes.

As shown in step 510, each node may then receive an input bandwidth from each neighbor corresponding to the value determined at each neighbor in step 508.

As shown in step 512, the input bandwidth and output bandwidth may be stored at each node, such as in the neighborhood information 312 described above.

As shown in step 514, each node may calculate a node weight value based upon the bandwidth values. This calculation may, for example, use Eq. 1 above, or any other suitable calculation for obtaining a metric representative of the data. For example, instead of just using the node weight value as determined by Eq. 1, this value may be limited with an upper and/or lower bound. The node weight value may also, or instead, be modified to meet bit requirements in a control word, such as by providing a one byte, eight bit, or smaller representative value.

As shown in step 516, each node may then send the node weight value calculated in step 514 to each one hop neighbor.

As shown in step 518, each node may then in complementary fashion receive a node weight value from each one hop neighbor.

As shown in step 520, each node may then store the node weight values for other nodes in a one hop and two hop neighborhood. By propagating information in this manner, each node may obtain a view of input and output demands for each node in a two hop neighborhood, as represented in the neighborhood information 312 for each node.

As shown in step 522, each node may determine access to time slots for transmitting to other nodes using a fair access technique as described for example in U.S. application Ser. No. 11/947,928 filed on Nov. 30, 2007 and entitled "Communication scheduling of network nodes using fair access and weighting techniques," the entire content of which is incorporated herein by reference. Without loss of generality of this disclosure or the '978 application, the fair access technique may include generating a random number for each node in each time slot, and using the random number to select an exclusive transmit node (e.g., the node with the highest random number) for that time slot. By using the same pseudo-random number generator in all nodes, and by using node identifiers or other information known to all nodes in a one or two hop neighborhood to seed the pseudo-random number generator, a consistent sequence of random numbers may be created in each node so that only one node within the neighborhood transmits in each time slot. This step may result in a transmit schedule such as that depicted in FIG. 4.

As shown in step 524, network scheduling may then be determined based on the fair access technique and the node weight values, again as described for example in U.S. application Ser. No. 11/947,928. Again without loss of generality of this disclosure or the '978 application, this may include weighting the outcomes of the random number generator according to node weights so that each node gains access to time slots in proportion to the node's data requirements. More generally, any technique for synchronizing transmission time slots in a MANET may usefully be employed, and the results of this synchronization—more particularly the allocation of transmit time slots to a node—may be fed back to the bandwidth output value calculations described above in order to balance channel access with the data output requirements for each node.

Since reception of control timeslots in any one-hop neighborhood is not guaranteed, certain nodes (those that do not receive the control timeslots) may be using a different set of bandwidth and node weight values compared to those nodes that did receive bandwidth values and node weight values in the control timeslots. Thus, with inconsistent data upon which to base fair access calculations, collisions may occur. In one embodiment, this may be addressed by adding a countdown value associated with each bandwidth value in the control timeslot. For example, if the control timeslot has a 1 byte-word and 6 bits are used for a node weight value, two bits may be used for a countdown value. In one particular example, each node may be synchronized using the Global Positioning System (GPS) so that each node is synchronized every 1 pulse per second (PPS). Since the countdown values need to propagate to two-hop neighbors, the countdown values associated with each item may be "2." Each node may still compute a bandwidth value for each link; however when a node's link bandwidth value changes (up or down), that node, node X, for example, is not allowed to immediately use the new bandwidth value in network scheduling. Instead, node X may send (using control timeslots) to all its one-hop neighbors the new bandwidth value and sets the countdown value to 2. The old bandwidth value is used in network scheduling by node X during the next second. After the next 1 PPS, Node X sends (using control timeslots) to all of its one-hop neighbors the new bandwidth value and sets the countdown value to 1. The old BW value is used by Node X in network scheduling during the next second. After the next 1 PPS, Node X sends (using control timeslots) to all of its one-hop neighbors the new bandwidth value and sets the countdown value to 0. The new bandwidth value may now be used by Node X in network scheduling during the next second. Until the bandwidth value needs to be changed, all future control timeslots will have the new bandwidth value and will keep the countdown value at 0. In one example, a countdown value of 0 indicates a given bandwidth value is being used. In one example, the countdown value does not drop below zero and once a countdown has started, it continues to zero. In other examples, a countdown value may be replace by a counter that increments rather than decrements to a predetermined value. In other examples, whether the counter increments or decrements, the final value may be any predetermined value.

A wide range of software and hardware platforms may be used to deploy the systems and methods described herein. Generally, the system components may be realized in hardware, software, or some combination of these. The components may be realized in one or more microprocessors, microcontrollers, embedded microcontrollers, programmable digital signal processors or other programmable devices, along with internal and/or external memory such as read-only memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, and program output or other intermediate or final results. The components may also, or instead, include one or more application specific integrated circuits (ASICs), dedicated semiconductor devices, programmable gate arrays, programmable array logic devices, or any other device that may be configured to process electronic signals.

Any combination of the above circuits and components, whether packaged discretely, as a chip, as a chip set, or as a die, may be suitably adapted to use with the systems described herein. It will further be appreciated that the above components may be realized as computer executable code created using a structured programming language such as C, an object oriented programming language such as C++, or any other high-level or low-level programming language that may be compiled or interpreted to run on one of the above devices, as well as heterogeneous combinations of processors, processor architectures, or combinations of different hardware and software. Any such combination of hardware and software suitable for use in an ad hoc network as described herein may be employed without departing from the scope of this disclosure.

Those skilled in the art will recognize, or will be able to ascertain using no more than routine experimentation, numerous equivalents to the systems and methods described herein. Such equivalents are considered to fall within the scope of the present invention. Moreover, the embodiments described herein are intended to exemplify the invention and not to limit it. While the invention is described above in connection with certain preferred embodiments, other embodiments may be understood by those of ordinary skill in the art. All such variations, modifications, extensions, additions, omissions, and the like as would be apparent to one of ordinary skill in the art are intended to fall within the scope of this disclosure, which is to be interpreted in the broadest sense allowable by law.

What is claimed is:

1. A method comprising:
   determining a value indicative of a data output requirement for a node in an ad hoc network, the node having a plurality of one hop neighbors coupled in direct wireless communication with the node to form a neighborhood including as participants the node and the plurality of one hop neighbors;
   determining a value indicative of a transmission capacity for the node;
   calculating a bandwidth output metric for the node based upon the transmission capacity and the data output requirement;
   communicating the bandwidth output metric to the plurality of one hop neighbors of the node;

receiving a corresponding bandwidth output metric from each one of the plurality of one hop neighbors of the node in an exchange of information whereby each one of the plurality of one hop neighbors share a common view with the node of all of the bandwidth output metrics for the neighborhood; and determining network scheduling that allocates at least one time slot to each participant in the neighborhood, wherein the network scheduling is biased in favor of at least one of the plurality of nodes in the neighborhood based on the bandwidth output metric for the node and the corresponding bandwidth output metric from each one of the plurality of one hop neighbors of the node.

2. The method of claim 1 wherein the data output requirement is based upon a size of a number of data output queues.

3. The method of claim 2 further comprising adjusting the bandwidth output metric according to a change in the size of the number of data output queues.

4. The method of claim 1 wherein determining a value indicative of the transmission capacity includes negotiating for one or more channel access rights with at least one of the plurality of one hop neighbors.

5. The method of claim 1 wherein network scheduling includes determining one or more channel access rights using a fair access technique weighted according to the neighbor bandwidth output metric for each one of the plurality of one hop neighbors.

6. The method of claim 5 further comprising determining the transmission capacity for the node based upon the one or more channel access rights.

7. The method of claim 1 further comprising retransmitting the neighbor bandwidth output metric to each one of the plurality of one hop neighbors.

8. The method of claim 1 further comprising transmitting the bandwidth output metric for the node to each one of the plurality of one hop neighbors.

9. A computer program product comprising computer executable code embodied in a non-transitory computer readable medium that, when executing on one or more computing devices, performs the steps of:
   determining a value indicative of a data output requirement for a node in an ad hoc network, the node having a plurality of one hop neighbors coupled in direct wireless communication with the node to form a neighborhood including as participants the node and the plurality of one hop neighbors;
   determining a value indicative of a transmission capacity for the node;
   calculating a bandwidth output metric for the node based upon the transmission capacity and the data output requirement;
   communicating the bandwidth output metric to the plurality of one hop neighbors of the node;
   receiving a corresponding bandwidth output metric from each one of the plurality of one hop neighbors of the node in an exchange of information whereby each one of the plurality of one hop neighbors share a common view with the node of all of the bandwidth output metrics for the neighborhood; and
   determining network scheduling that allocates at least one time slot to each participant in the neighborhood, wherein the network scheduling is biased in favor of at least one of the plurality of nodes in the neighborhood based on the bandwidth output metric for the node and the corresponding bandwidth output metric from each one of the plurality of one hop neighbors of the node.

10. The computer program product of claim 9 wherein the data output requirement is based upon a size of a number of data output queues.

11. The computer program product of claim 10 further comprising code that performs the step of adjusting the bandwidth output metric according to a change in the size of the number of data output queues.

12. The computer program product of claim 9 wherein determining a value indicative of the transmission capacity includes negotiating for one or more channel access rights with at least one of the plurality of one hop neighbors.

13. The computer program product of claim 9 wherein network scheduling includes determining one or more channel access rights for the node based upon the neighbor bandwidth output metric from each one of the plurality of one hop neighbors.

14. The computer program product of claim 13 further comprising code that performs the step of determining one or more channel access rights using a fair access technique weighted according to the neighbor bandwidth output metric for each one of the plurality of one hop neighbors.

15. A device comprising:
   a data queue that stores data;
   a data link that packetizes data from the data queue into packets, and that negotiates access to a number of time slots in a mobile ad hoc network;
   a radio that provides an air interface to the mobile ad hoc network and transmits the packets during the one or more time slots; and
   a signal processor that calculates a bandwidth output value for the device, the bandwidth output value representing a size of the data queue relative to the number of time slots, and that transmits the bandwidth output value to one or more neighboring nodes during a control time slot, the signal processor further configured to receive a corresponding bandwidth output metric from each the one or more neighboring nodes and to determine network scheduling that allocates at least one time slot to each participant in a neighborhood that includes the device and the one or more neighboring nodes, wherein the network scheduling is biased in favor of at least one of the plurality of nodes in the neighborhood based on the bandwidth output metric for the node and the corresponding bandwidth output metric from each of the one or more neighboring nodes.

16. The method of claim 1 wherein the neighborhood includes a plurality of two hop neighbors of the node.

17. The computer program product of claim 9 wherein the neighborhood includes a plurality of two hop neighbors of the node.

18. The device of claim 15 wherein the neighborhood includes a plurality of two hop neighbors of the node.

* * * * *